April 21, 1964     H. E. ASHFIELD     3,129,610

MULTI-RATIO TRANSMISSION MECHANISMS FOR VEHICLES

Filed March 20, 1961     2 Sheets-Sheet 1

Inventor
HERBERT EDWARD ASHFIELD
By Norris & Bateman
Attorneys

April 21, 1964    H. E. ASHFIELD    3,129,610
MULTI-RATIO TRANSMISSION MECHANISMS FOR VEHICLES
Filed March 20, 1961    2 Sheets-Sheet 2

Inventor
HERBERT EDWARD ASHFIELD
By Morris & Bateman
Attorneys

United States Patent Office 3,129,610
Patented Apr. 21, 1964

3,129,610
MULTI-RATIO TRANSMISSION MECHANISMS FOR VEHICLES
Herbert Edward Ashfield, Meltham, Huddersfield, England, assignor to David Brown Tractors Limited
Filed Mar. 20, 1961, Ser. No. 97,073
10 Claims. (Cl. 74—752)

The invention relates to a new or improved multi-ratio power transmission mechanism for vehicles, and has for its object to provide means whereby changes of transmission ratio are made automatically when varying load conditions require such changes to be made.

According to the invention, a vehicle transmission mechanism is provided with means whereby automatic changes of gear ratio can be made at predetermined engine or vehicle speeds, said means comprising a pump of positive displacement type adapted to be driven at a speed proportional to the speed of the engine or of the vehicle; a plurality of valves adapted to open and close in a determined order as the engine or vehicle speed (and thus the pressure of the liquid delivered by the pump) increases or decreases; and clutch, brake or like means actuated by the liquid under pressure for establishing the appropriate one of several available transmission ratios, said means being actuated selectively and individually according to the positioning of said valves. Preferably, means will be provided for accurately determining the liquid pressure at any particular pump speed. Means may also be provided for preventing the automatic changing of gear ratio when desired, and for manually selecting and retaining a particular gear ratio regardless of engine or vehicle speed.

Figure 1:
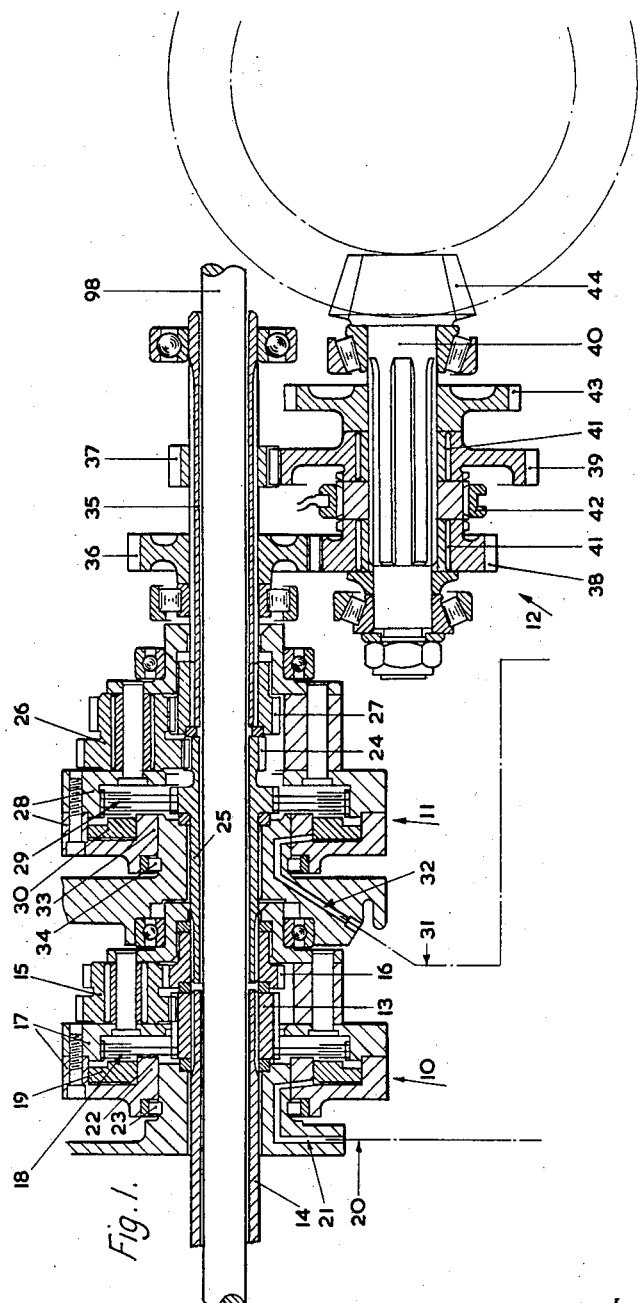
Figure 2:
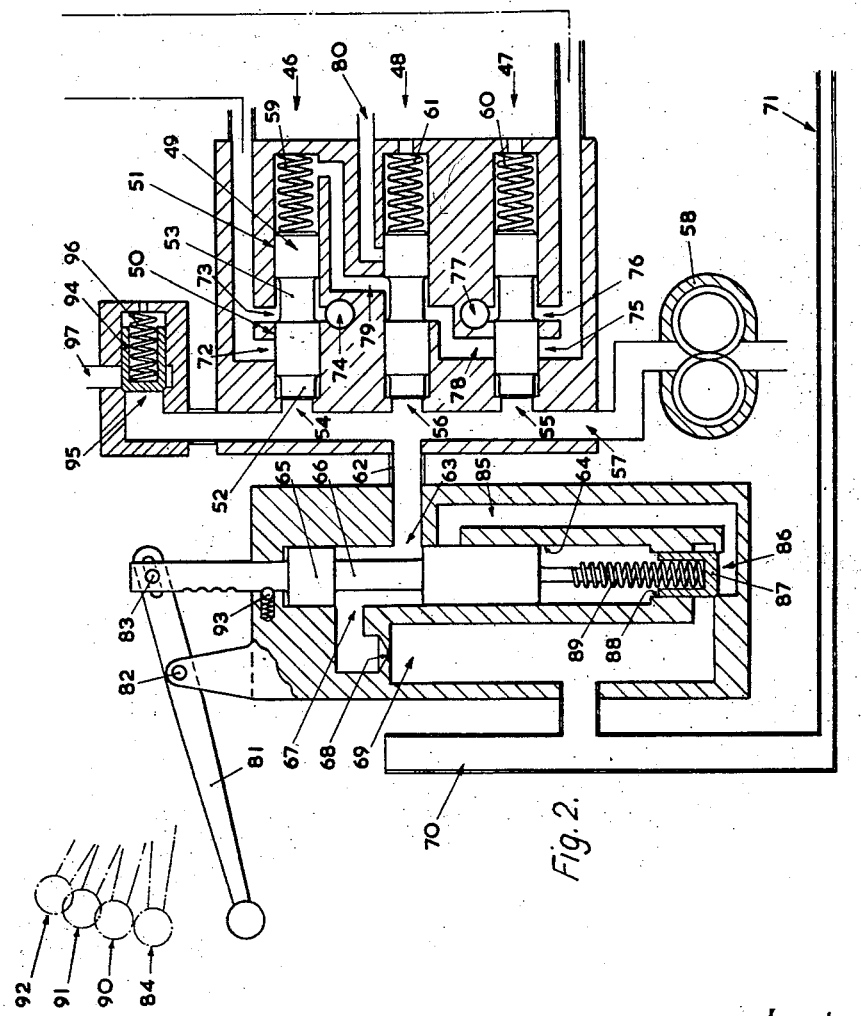

A preferred embodiment of the invention will now be described with reference to the accompanying drawings of which:

FIG. 1 is a semi-diagrammatic sectional elevation of a multi-ratio power transmission mechanism; and FIG. 2 is a semi-diagrammatic sectional elevation of a change-speed control mechanism therefor.

Referring now to FIG. 1, a constant mesh gearbox includes a first epicyclic reduction set indicated generally at 10, a second epicyclic reduction set indicated generally at 11, and range gears indicated generally at 12.

The first reduction set 10 comprises an input sun pinion 13 secured by splines on the end of a hollow input shaft 14; compound planets 15 in mesh with said input sun pinion and with an output sun pinion 16; and a planet carrier 17. A multi-plate clutch 18 is provided by means of which the input sun pinion 13 can be locked to said planet carrier and so cause the first reduction set 10 to rotate bodily as a unit. Engagement of said clutch is effected by a hydraulically operated annular piston member 19 which is slidable in a chamber formed in the planet carrier 17 and which is adapted to be acted upon by oil under pressure directed, as hereinafter described, to said chamber through a conduit 20. Said conduit communicates with said chamber by way of a passage 21 formed in a spigot member 22 which is fixed relative to the frame (not shown) of the vehicle. Said spigot member also serves as the reaction member of the reduction set 10 when the clutch 18 is not engaged, a roller ratchet brake 23 being provided to allow uni-directional rotation of the planet carrier 17.

The reduction set 11 comprises an input sun pinion 24, which is formed at one end of a hollow shaft 25 on the other end of which there is secured by splines the output sun pinion 16 of the reduction set 10; compound planets 26 which mesh with the input sun pinion 24 and with an output sun pinion 27; and a planet carrier 28. A multi-plate clutch 29 is provided by means of which the shaft 25 can be locked to said planet carrier and so cause the second reduction set 11 to rotate bodily as a unit. Engagement of said clutch is effected by a hydraulically operated annular piston member 30 which is slidable in a chamber formed in the planet carrier 28 and which is adapted to be acted upon by oil under pressure directed, as hereinafter described, to said chamber through a conduit 31. Said conduit communicates with said chamber by way of a passage 32 formed in a spigot member 33 which is fixed relative to the frame (not shown) of the vehicle. Said spigot member also serves as the reaction member of the reduction set 11 when the clutch 29 is not engaged, a roller ratchet brake 34 being provided to allow uni-directional rotation of the planet carrier 28.

The output sun pinion 27 of the reduction set 11 is secured by splines on the forward end of a hollow shaft 35 which is adapted to transmit drive to the range gears 12. Said range gears comprise two drive gears 36 and 37 secured by splines on the hollow shaft 35, and two driven gears 38 and 39 mounted on an output shaft 40 and meshing respectively with said drive gears. The driven gears 38 and 39 are rotatably mounted with respect to the output shaft 40 by means of needle roller bearings 41, but they are capable of being individually and selectively secured thereto by a toothed clutch 42. A reverse gear 43 capable of receiving drive from the hollow shaft 35 by indirect means (not shown), is secured by splines on the output shaft 40, and a bevel pinion 44 is formed integrally on the latter. Said bevel pinion meshes with a crown wheel from which drive is transmitted to the vehicle rear wheels (not shown).

Since the first reduction set 10, the second reduction set 11, and the range gears 12 are arranged in series, and the reduction set 11 can provide a substantially greater speed reduction than the reduction set 10, it will be understood that by the selective engagement of the multi-plate clutches 18 and 29, four different drive ratios through the complete gear train can be obtained whichever of the gears 38 or 39 is for the time being secured to the output shaft 40. In other words, a total of eight different drive ratios is available.

The greatest speed reduction through the epicyclic reduction sets 10 and 11, that is between the input shaft 14 and the shaft 35, is obtained when both the multi-plate clutches 18 and 29 are disengaged, as shown in the drawing. A first increase in speed ratio is obtained by the engagement of the clutch 18, a second increase in speed ratio is obtained by disengaging the clutch 18 and simultaneously engaging the clutch 29, and a third increase in speed ratio is obtained by the simultaneous engagement of both said clutches to cause both reduction sets 10 and 11 to rotate bodily and a direct drive to be transmitted from the input shaft 14 to the shaft 35.

The mechanism shown in FIG. 2 is adapted to control the operation of the multi-plate clutches 18 and 29, and essentially comprises three differential valves 46, 47 and 48. Each differential valve comprises a slidable cylindrical spool member 49 having lands 50 and 51 and portions 52 and 53 of reduced diameter. The portions 52 of the three spool members are adapted to close respective ports 54, 55 and 56, which each communicate, by way of a main oil gallery 57, with a gear pump 58 driven at a speed proportional to the speed of the shaft 35.

The differential valves 46, 47 and 48 are provided with respective coil compression springs 59, 60 and 61 of such strengths that the spool member 49 of the valve 46 is caused to close the port 54 until acted upon by an oil pressure of a predetermined value, the spool member 49 of the valve 47 is caused to close the port 55 until acted upon by an oil pressure predeterminedly in excess of that required to open the port 54, and the spool member 49 of the valve 48 is caused to close the port 56 until acted upon by an oil pressure predeterminedly in excess of that required to open the port 55.

The main oil gallery 57 communicates, by way of a conduit 62 and a port 63, with a bore 64 in which a spool-type valve member 65 is slidable. When said valve member is positioned as shown in the drawing, the main oil gallery can also communicate, by way of the space surrounding a portion 66 of reduced diameter formed in said valve member, and by way of a port 67, with a sharp-edged orifice 68 opening into a chamber 69 which communicates with a lubrication oil header pipe 70. Normally, that is when the valve member 65 is positioned as shown in the drawing, the oil discharged by the pump is able to flow by way of the main oil gallery 57, the conduit 62, the port 63, the space surrounding the portion 66 of the valve member 65, the port 67, the orifice 68, and the chamber 69, to the header pipe 70. Except for a small quantity which passes through a conduit 71 to the gearbox for lubrication purposes, the oil returns to sump by flowing from the open upper end of said header pipe.

By virtue of the total pump discharge normally having to pass through the orifice 68, the pressure of oil in the main oil gallery 57 at any particular pump speed can be accurately predicted and is unaffected by changes in oil temperature, and thus in viscosity, which occur during service. The strength of each one of the springs 59, 60 and 61 required to hold its associated differential valve closed until the pump 58 has attained an appropriate speed at which said valve should yield, can therefore be accurately predetermined.

It will be seen that each cylindrical spool member 49 is so formed that when held in its closed position, as shown in the drawing, by its associated spring, the cross-sectional area which is exposed to the pressure of oil discharged by the pump 58 is determinedly less than that which is exposed when the force of said spring has been overcome and the valve has opened. Each differential valve is thus adapted to close at a determinedly lower oil pressure than that at which it is adapted to open.

When the vehicle accelerates from rest, the oil pressure in the main oil gallery 57 increases and, at a pressure of say 40 p.s.i., the spool member 49 of the differential valve 46 is moved axially against the force of the spring 59 to uncover a port 72 which communicates with the conduit 20 previously referred to. Simultaneously, a port 73, adapted when open to allow said conduit to communicate with sump by way of the space surrounding the portion 53 of said spool and a passage 74, is closed off by the land 50. The multi-plate clutch 19 is thus caused to be engaged by oil under pressure passing by way of the ports 54 and 72, and of the conduit 20, from the main oil gallery 57 to the chamber in which the piston member 19 is slidable. As the speed of the tractor increases the oil pressure in the main oil gallery 57 increases proportionally and, at a pressure of say 80 p.s.i., the spool member 49 of the differential valve 47 is moved axially against the force of the spring 60, to uncover a port 75 which communicates with the conduit 31 previously referred to, and simultaneously to close off a port 76 adapted when open to allow said conduit to communicate with sump by way of the space surrounding the portion 53 of said spool and a passage 77. In addition, a port 78 is simultaneously uncovered, allowing oil to flow from the main oil gallery 57 to a space behind the spool 49 of the differential valve 46 by way of the ports 55 and 78, the space surrounding the portion 53 of the spool 49 of the differential valve 61, and a passage 79, said oil supplementing the force of the spring 59 and closing the valve 46. The multi-plate clutch 18 is thus caused to be disengaged as the multi-plate clutch 29 is engaged, oil under pressure passing by way of the ports 55 and 75, and of the conduit 31 from the main oil gallery 57 to the chamber in which the piston member 30 is slidable, whilst the oil in the chamber in which the piston member 19 is slidable escapes to sump by way of the conduit 20, the port 73 and the passage 74.

As the speed of the vehicle increases still further, the oil pressure in the main oil gallery 57 also continues to increase and, at a pressure of say 150 p.s.i., the spool member 49 of the differential valve 48 is moved axially against the force of the spring 61 to close off the port 78, and simultaneously to put the passage 79 in communication with a passage 80 by way of the space surrounding the portion 53 of said spool member. The oil contained in the space behind the spool member 49 of the differential valve 46 is thus able to escape, by way of the communicating passage 79 and 80, to sump. The spring 59 is therefore no longer aided by said oil, and is caused to yield by the pressure of oil in the main gallery 57 acting on its associated spool member 49, which is caused to move axially once again to effect the re-engagement of the multi-plate clutch 18, whilst the clutch 29 remains engaged.

Thus it will be seen that whichever speed range is selected by the driver of the vehicle, either the gear 38 or the gear 39 being secured to the output shaft 40 by means of the toothed clutch 42, upward exchanges of gear ratio between the input shaft 14 and the shaft 35 are made automatically in accordance with the increase in oil pressure in the main oil gallery 57 as the speed of the vehicle increases. When the vehicle is retarded, as a result of the driver closing the throttle or applying the brakes, or as a result of climbing a hill, and the oil pressure in the main oil gallery 57 consequently decreases, the differential valves 46, 47 and 48 act in the reverse order to that just described to cause the automatically controlled mechanism to make successive downward changes of gear ratio.

Means are provided for rendering the automatic control of the clutches 18 and 29 inoperative, and for manually selecting and subsequently maintaining any particular gear ratio required. Said means comprise a hand lever 81 pivoted at 82 and pivotally connected to one end of the spool type valve 65 by means of a pin and slot arrangement 83. The hand lever 81 is adapted to control the axial disposition of the spool type valve member 65, that is to say to move it from the position shown in the drawing, in which position automatic engagement and disengagement of the clutches 18 and 29 is effected, into a selected one of four alternative positions.

Movement of the hand lever 81 from the position shown in the drawing to a position indicated at 84 moves the valve member 65 into a position in which the port 63 can no longer communicate with the chamber 69 by way of the space surrounding the portion 66 of said valve member, the port 67 and the sharp-edged orifice 68. The port 63 is, however, simultaneously caused to communicate, by way of the space surrounding said portion 66, with a passage 85, and oil discharged by the pump 58 is able to flow from the main oil gallery 57 to the chamber 69, and thus to sump, by way of said passage 85 and of a port 86.

Since the port 86 is adapted to be closed by means of a valve member 87 slidable axially in a bore 88 co-axial with the bore 84, the pressure of oil in the main oil gallery 57, when the latter communicates with sump by way of the passage 85, is dependent upon the force with which a compression spring 89 urges said valve member into its closed position to restrict the flow of oil through the port 86 and not, as previously, upon the output of the pump 58. Movement of the hand lever 81 to the position 84 causes the valve member 65 to effect only very light compression of the spring 89 in order that the valve member 87 will open at a lower oil pressure than that at which the differential valve 46 is adapted to open, or indeed adapted to close, and the clutches 18 and 29 will both remain disengaged to provide the greatest speed reduction between the input shaft 14 and the shaft 35. Movement of the hand lever 81 to any of the positions indicated at 90, 91 and 92 does not affect the hydraulic circuit established by movement of said lever to the position 84, but results in proportionately greater pre-loading of the spring 19 by the valve member 65. The valve member 87 is thus adapted to open— when the hand lever 81 is positioned at 90—at a pressure higher than that at which the differential valve 46 is adapted to open but lower than that at which the differential valve 47 is adapted to close, thus causing the clutch 18 to be engaged;

when said hand lever is positioned at 91—at a pressure higher than that at which the differential valve 47 is adapted to open but lower than that at which the differential valve 48 is adapted to close, thus causing the clutch 29 alone to be engaged; and when said hand lever is positioned at 92—at a pressure higher than that at which the differential valve 48 is adapted to open, thus causing both the clutches 18 and 29 to be engaged.

Thus it will be seen that any of the four gear ratios available between the input shaft 14 and the shaft 35 can be selected and retained indefinitely provided that the shaft 35, which drives the pump 53, continues to rotate. It will be understood that if the hand lever 81 is moved to any of the positions 90, 91 and 92 whilst the vehicle is stationary, the vehicle will commence to move, when drive is transmitted to the input shaft 14, with both clutches 18 and 29 disenaged or, in other words, with the greatest possible speed reduction between said input shaft and the shaft 35. As the vehicle gathers speed, however, one or more upward changes of gear ratio will be made automatically until the manually selected ratio is reached and subsequently maintained. The speed with which said upward changes are made is dependent on the power to weight ratio, and if the power to weight ratio is high, and the gear ratio between the vehicle engine and the road wheels is not too high, the change to the manually selected ratio will be almost instantaneous.

A detent device, indicated generally at 93 and comprising a spring pressed ball adapted to engage a series of depressions in the valve member 65, is provided to enable the driver of the vehicle to "feel" movement of said valve member into any required position, and to retain said valve member in any position to which it has been moved. In addition, a maximum pressure relief valve is provided, and comprises a valve member 94 adapted to close a port 95 communicating directly with the main oil gallery 57. A spring 96, which normally holds the valve member 94 in the closed position, is adapted to yield when the pressure in the main oil gallery 57 exceeds say 170 p.s.i. to allow oil to leak off to sump through a conduit 97.

A power take-off shaft 98 extends through the co-axial hollow shafts 14 and 35 but forms no part of the present invention.

The power transmission and change mechanism described and illustrated is suitable for a wide range of vehicles, for example tractors, trucks, etc. One disadvantage which will be apparent, however, is that due to the provision of the roller ratchet brakes 23 and 34 the engine of the vehicle can only be used as a brake when both the clutches 18 and 29 are engaged. If the vehicle is an agricultural tractor this disadvantage may not be important, since the speed reduction between the engine and the driving wheels, even in top gear is considerable, and the mechanism, when adapted to change gear automatically, will ensure that top gear is engaged when the vehicle descends an incline. Moreover, when any particular reduction ratio is manually selected by the driver of the vehicle, he can immediately effect the engagement of top gear by moving the hand lever 81 to the position 92 when engine braking is desirable.

If the vehicle is a truck, however, wherein the transmission ratios, especially in top gear, are generally much higher than those of an agricultural tractor, normal engine braking will not be obtained. It is therefore proposed that a valve should be fitted in the exhaust manifold of the truck engine, said valve being adapted to restrict the flow of exhaust gases in known manner, to an extent controllable by the driver of the truck. The control means of said valve may if desired be coupled to the control means of conventional friction brakes. If, in addition, the supply of fuel to the engine is capable of being cut off simultaneously with the closing of the valve in the exhaust manifold, a steep hill could be negotiated in top gear with the throttle valve in the inlet manifold wide open, thus using to full advantage the braking effect produced by the engine acting as an air compressor.

An alternative power transmission mechanism, avoiding the use of roller ratchet brakes whilst still retaining the simplicity of control of the mechanism previously described and illustrated, could be provided by employing spring-engaged friction brakes performing the function of the roller ratchet brakes 23 and 34. In this case, the opening of an appropriate differential valve would have the effect of engaging one or both of the oil-operated friction clutches 18 or 29 to obtain a direct drive through one or both of the reduction sets, whilst simultaneously disengaging the appropriate one, or both, of the spring-engaged brakes against the force of the springs provided for holding it, or them, engaged. Each of the oil-operated clutches could be mechanically linked with its associated spring-engaged brake to prevent simultaneous engagement. It will be understood, however, that the means for controlling the clutches and brakes need in no way be altered from that described and illustrated, and that such a power transmission mechanism would still be within the scope of the appendant claims. Furthermore, the scope of said claims is not limited to a mechanism providing only four automatic gear selections, but extends to mechanisms adapted to provide any number of automatic gear selections depending on the number of differential valves and reduction sets provided.

Other modifications, which will be apparent to those skilled in the art, may be made without departing from the scope of the following claims.

I claim:

1. In a vehicle transmission mechanism, multi-ratio gear transmission means comprising a plurality of gear reduction sets connected together in series and having an output member driven thereby and connected to drive means for the vehicle wheels, and hydraulic mechanism operative to effect changes of gear ratio in said transmission means only in response to changes of speed of said output member, said hydraulic mechanism comprising clutch means for rendering individual reduction sets inoperative, fluid pressure responsive means for actuating said clutch means, means including a pump for supplying fluid under pressure to said fluid pressure responsive means for actuating said clutch means, means including a plurality of valves responsive to pressure of fluid supplied by said pump for controlling the supply of fluid to said fluid pressure responsive means, means whereby said valves open in response to different predetermined fluid pressures and in predetermined sequence to supply fluid to said pressure responsive means, and means for driving said pump at a speed proportional to that of said output member for increasing and decreasing the pressure of supplied fluid respectively with increases and decreases in the speed of said output member to thereby control the actuation of said clutch means in accordance with the speed of said output member.

2. In a vehicle transmission mechanism, multi-ratio gear transmission means comprising a plurality of gear reduction sets connected together in series and having an output member driven thereby and connected to drive means, and hydraulic mechanism operative to automatically effect changes of gear ratio in said transmission gear means only in response to changes of speed of said output member, said hydraulic mechanism comprising clutch means for rendering individual reduction sets inoperative, fluid pressure responsive means for actuating said clutch means, means including a pump for supplying fluid under pressure to said fluid pressure responsive means for actuating said clutch means, means including a plurality of valves responsive to fluid pressure for controlling the supply of fluid to said fluid pressure responsive means, means whereby said valves open at different predetermined fluid pressures, and in predetermined sequence to supply fluid to said pressure responsive means for actuating said clutch means, means for driving said pump at a speed proportional to that of said output member for increasing and decreasing the pressure of supplied fluid respectively with increases and decreases in the speed of said output member so that the speed of said transmission is controlled by the speed of the vehicle, and means defining an orifice of constant cross sectional area communicating with the discharge side of the pump for determining the pressure of fluid acting on the valves at a particular pump speed regardless of temperature and viscosity variations.

3. In a vehicle transmission mechanism, multi-ratio gear transmission means comprising first and second reduction sets connected together in series with an output member driven thereby and connected to drive means for the vehicle wheels, and hydraulic mechanism operative to effect changes of gear ratio in said transmission means only in response to changes of speed of said output member, said hydraulic mechanism comprising first and second clutch means for rendering respective reduction sets inoperative, first and second fluid pressure responsive means for engaging respective clutch means, means including a pump for supplying fluid under pressure to actuate said first and second fluid pressure responsive means, means for driving said pump at a speed proportional to that of said output member to render said pump operative to supply fluid at a pressure that varies directly with the speed of said output member, means including a first valve responsive to supply fluid pressure for controlling the delivery of supply fluid for actuating said first fluid pressure responsive means and thus engaging said first clutch means, means including a second valve responsive to supply fluid pressure for controlling the delivery of supply fluid to actuate said second fluid pressure responsive means, thus engaging said second clutch means, means whereby said first and second valves open in response to different predetermined fluid pressures in predetermined sequence for permitting supply of fluid to said first and second fluid pressure responsive means for actuating said first and second clutch means, the pressure at which said second valve opens being predeterminedly greater than that at which said first valve is opened, means for closing said first valve to block fluid flow to said first fluid pressure responsive means and thus disengage said first clutch means simultaneouly with the opening of said second valve, means including a third pressure responsive valve, and means whereby said third valve opens in response to a third fluid pressure predeterminedly greater than that at which said second valve is openable, for re-actuating said first fluid pressure responsive means and thus re-engaging said first clutch means.

4. The vehicle transmission mechanism as set forth in claim 1, wherein each of said valves comprises a valve body portion having a port communicating with the discharge side of said pump, and a spool member slidably mounted in said valve body portion, said spool member having a portion at one end for closing said port and having a portion of larger diameter effective to present to the fluid pressure when said valve is open a larger cross sectional area than the cross sectional area of said port.

5. The vehicle transmission mechanism as set forth in claim 2, further comprising valve means for preventing the flow of fluid through the orifice and for diverting said flow through a spring biased closed valve, a hand lever connected to said valve means, and means also under the manual control of said hand lever for varying the force of the spring of said spring closed valve to control the fluid pressure acting on the differential valves independently of vehicle speed.

6. In a vehicle change speed transmission, a plurality of variable ratio gear reduction sets connected together in series and having an output member conected to wheel drive means, hydraulic means for effecting changes in gear ratio in said transmission for driving said output member at different speeds comprising a clutch in each gear reduction set, fluid pressure responsive elements each operable to actuate a different one of said clutches, a hydraulic system including a pump for supplying fluid under pressure to said fluid pressure responsive elements, means for driving said pump at a speed proportional to that of said output member whereby said pump is operable to supply fluid at a pressure that varies in proportion to the driven speed of said output member, a plurality of control valves disposed in said hydraulic system and each being responsive to supply fluid pressure to control the supply of fluid to one of said elements and means whereby each of said valves opens in response to a different predetermined fluid pressure in predetermined sequence to thereby vary the gear ratio drive in accordance with the speed of said output member.

7. In a vehicle change speed transmission, a plurality of variable ratio gear reduction sets connected together in series and having an output member connected to wheel drive means, hydraulic means for effecting changes in gear ratio in said transmission for driving said output member at different speeds comprising a clutch in each gear reduction set, a plurality of fluid pressure responsive elements each operable to actuate a different one of said clutches, a hydraulic system including a pump for supplying fluid under pressure to said fluid pressure responsive means, means for driving said pump at a speed proportional to that of said output member for delivering fluid under a pressure that varies in proportion to the driven speed of said output member, a plurality of fluid pressure responsive control valves associated one with each of said elements and being so arranged in hydraulic system to each control the supply of fluid under pressure to associated ones of said fluid pressure responsive elements, means whereby said valves are opened at different predetermined fluid pressures in predetermined sequence to effect changes in said gear ratio in accordance with the speed of said output member, and means for selecting and maintaining predetermined maximum fluid pressure levels for said system comprising an adjustable by-pass at the discharge side of said pump.

8. In a vehicle change speed transmission, at least two variable ratio gear reduction sets connected together in series and having an output member connected to wheel drive means, hydraulic means for effecting changes in gear ratio in said transmission for driving said output member at different speeds comprising a clutch in each gear reduction set, fluid pressure responsive elements each operable to actuate a different one of said clutches, a hydraulic system including a pump for supplying fluid under pressure to said fluid pressure responsive elements, means for driving said pump at a speed proportional to that of said output member and cooperating with said system to vary the pressure of supplied fluid only in proportion to the driven speed of said output member, a plurality of fluid pressure responsive control valves associated one with each of said fluid pressure responsive elements and being so arranged in said hydraulic system as to control the supply of fluid to associated ones of said elements, means in said system providing a fluid chamber to which fluid is supplied under pressure by said pump, each of said valves comprising a spring biased piston having a surface exposed to said chamber of said system so as to be operable by the system fluid pressure, means whereby said valves are opened in response to different predetermined pressure in predetermined sequence to correspondingly vary the gear ratio drive effective on said output member.

9. In a vehicle change speed transmission, at least two variable ratio gear reduction sets connected together in series and having an output member connected to wheel drive means, hydraulic means for effecting changes in gear ratio in said transmission for driving said output member at different speeds comprising a clutch in each gear reduction set, first and second fluid pressure responsive means for actuating the respective clutches, a hydraulic system including a pump for supplying fluid under pressure to said fluid pressure responsive means, means for driving said pump at a speed proportional to that of said output member and cooperating with said system to vary the pressure of fluid supplied by said pump only in proportion to the driven speed of said output member, means providing a fluid chamber in said system to which fluid under pressure is supplied by said pump, means providing first and second fluid passages in said system for supplying fluid in said chamber respectively to said first and second fluid pressure reponsive means, first and second valves respectively disposed in said first and second passages for controlling supply of fluid to said first and second fluid pressure responsive means, said first and second valves respectively having first and second movable flow control valve members each having a surface exposed to fluid in said chamber for opening said valve members in response to fluid pressure in said chamber, first spring means biasing said first valve member to closed position in opposition to fluid pressure exerted on said surface of said first valve member to require a first predetermined fluid pressure in said chamber to open said first valve member, second spring means biasing said second valve member to closed position in opposition to fluid pressure exerted on said surface of said second valve member to require a second predetermined chamber fluid pressure of greater magnitude than said first predetermined pressure to open said second valve member, means providing a third fluid passage communicating with said second fluid passage for supplying pressurized fluid from said chamber to augment the biasing force exerted by said first spring means and thereby close said first valve member when said second valve member is open, a third valve for controlling the flow of fluid in said third passage and having a third valve member with a surface exposed to the fluid in said chamber for moving said third valve member to a position to block fluid flow through said third passage in response to fluid pressure in said chamber, third spring means biasing said third valve member to a position permitting fluid flow through said third passage in opposition to the pressure exerted on said third valve member by fluid in said chamber to require a third predetermined chamber fluid pressure of greater magnitude than said second predetermined pressure to move said third valve member to a position blocking flow through said third passage, thereby re-opening said first valve member to re-engage said first clutch when said third predetermined pressure is attained in said chamber.

10. In the vehicle change speed mechanism defined in claim 9, and means providing said chamber with an exit orifice of cross sectional area which determines the system pressures for automatic operation of said system, and means for varying the maximum system pressure comprising a bypass having a spring loaded outlet valve and manual means for selectively loading said spring to open at said first, second and third system pressures respectively.

References Cited in the file of this patent
UNITED STATES PATENTS

| | | |
|---|---|---|
| 941,426 | Loudon | Nov. 30, 1909 |
| 2,713,800 | Forster | July 26, 1955 |
| 2,738,650 | McAfee | Mar. 20, 1956 |
| 1,868,341 | Snoy | Jan. 13, 1959 |
| 1,933,172 | Fisher et al. | Apr. 19, 1960 |
| 2,946,241 | Snyder | July 26, 1960 |
| 2,995,949 | Gelenius et al. | Aug. 15, 1961 |